United States Patent [19]

Alabi

[11] Patent Number: 5,122,208
[45] Date of Patent: Jun. 16, 1992

[54] HYPO-EUTECTIC ALUMINUM-SILICON ALLOY HAVING TIN AND BISMUTH ADDITIONS

[75] Inventor: Muftau M. Alabi, Amherst, N.Y.

[73] Assignee: General Motors Corporation, Detroit, Mich.

[21] Appl. No.: 733,539

[22] Filed: Jul. 22, 1991

[51] Int. Cl.$^5$ ................. C22C 21/00; C22C 21/02
[52] U.S. Cl. .................... 148/440; 148/415;
148/417; 148/439; 420/529; 420/537; 420/540
[58] Field of Search ............... 148/158, 439, 159, 415,
148/416, 3, 417, 438, 440; 420/542, 546, 547,
530, 532

[56] References Cited

FOREIGN PATENT DOCUMENTS

| | | | |
|---|---|---|---|
| 0806139 | 2/1969 | Canada | 148/159 |
| 2124748 | 10/1972 | France . | |
| 0145741 | 6/1988 | Japan . | |
| 0681906 | 1/1952 | United Kingdom | 148/159 |

OTHER PUBLICATIONS

Aluminum alloys A356 and A357 Elemental Composition taken from "Aluminum Casting Technology" published by the American Foundrymen's Society, Inc., Des Plaines, Ill.

Primary Examiner—R. Dean
Assistant Examiner—Sikyin Ip
Attorney, Agent, or Firm—George A. Grove; Domenica N. S. Hartman

[57] ABSTRACT

An improved aluminum-silicon alloy having relatively substantial additions of tin and bismuth is provided which is particularly wear-resistant and sufficiently self-lubricating so as to be suitable for use in a wearing component even when poorly lubricated. The relatively high tin and bismuth additions within the alloy cooperate with the other elemental additions so as to provide a sufficiently low friction bearing surface (or self-lubricity) which significantly enhances the wear resistant properties of the alloy. In particular, the preferred aluminum alloy is used to form a socket plate which receives high strength steel bearing members within a compressor unit of an automobile air conditioning system. The improved aluminum alloy minimizes wear and alleviates galling of the socket plate during use. In addition, the improved aluminum alloy is also characterized by good strength and sufficient ductility so as to permit swaging of the socket plate formed from the alloy around a balled end of the high strength steel bearing members.

8 Claims, 1 Drawing Sheet

HYPO-EUTECTIC ALUMINUM-SILICON ALLOY HAVING TIN AND BISMUTH ADDITIONS

The present invention is related to copending patent application, U.S. Ser. No. 07/733,540, entitled "Hypo-Eutectic Aluminum-Silicon-Copper Alloy Having Bismuth Additions", filed Jul. 22, 1991, and assigned to the same assignee of the present application.

The present invention generally relates to hypo-eutectic aluminum-silicon alloys, particularly those alloys which are used in automotive applications. More particularly, this invention relates to such an aluminum-silicon alloy having relatively substantial additions of tin and bismuth; and wherein the inventive aluminum-silicon alloy is characterized by sufficient lubricity and strength to be extremely useful for wear resistant applications, yet also suitably ductile to readily permit swaging and/or other forming operations of the alloy

BACKGROUND OF THE INVENTION

Air conditioning systems are routinely employed within automobiles and other vehicles for creating comfortable conditions within the passenger compartment for the vehicle occupants. At outside temperatures above about 70° F., it is difficult to maintain a comfortable passenger compartment temperature without first cooling the air that is being blown into the passenger compartment.

Typically, cooling of the air is accomplished by first compressing an appropriate refrigerant, such as the commonly used fluorocarbons (known as freon) or other alternative refrigerants. Within an automobile, the engine-driven compressor compresses the vaporized refrigerant, thereby significantly raising the temperature of the refrigerant. The refrigerant then flows into a condenser where it is cooled and returned to its liquid state; thus, the heat added to the refrigerant in the compressor is transferred out of the system. The cooled liquid refrigerant is then sprayed through an expansion valve into an evaporator where it is again vaporized. The heat of vaporization required for vaporizing the refrigerant is drawn from the incoming outside air, which is blown around the evaporator. Any excess humidity contained within the incoming air is removed as condensation on the evaporator, thereby also drying the incoming air. The cooled, dry air then enters the passenger compartment of the vehicle.

The materials and components within the air conditioning system must be capable of withstanding extremely demanding conditions, particularly, the materials used to form the components within the engine driven compressor. The compressor contains many mating components which continuously wear against each other during operation of the air conditioning system, while also being subject to significant pressures due to the compressed refrigerant. Appropriate lubricants are provided throughout the compressor at these bearing surfaces where rubbing occurs, so as to prevent excessive wear and galling between the mating materials. Typically in the past, a lubricant which is soluble in the refrigerant has been added directly in with the refrigerant when charging the compressor with the pressurized refrigerant prior to use. Since the conventional lubricants have been soluble within the refrigerant, the lubricant therefore moves freely through the compressor with the refrigerant, thereby providing lubrication where it is needed most between mating components at their bearing surfaces.

However, due to environmental concerns, the current fluorocarbon-based refrigerants are being eliminated from use. Alternative refrigerants which alleviate environmental damage have been tested, with a 1,1,1,2-Tetrafluoroethane refrigerant, known as R134A, being a likely substitute. Unfortunately, conventional lubricants which have been previously (and successfully) employed with the fluorocarbon-based refrigerants are not soluble within the R134A refrigerant. Therefore the lubricant does not freely move throughout the compressor components and does not lubricate mating surfaces, as was the situation when the fluorocarbon-based refrigerants were used. The result is that during operation of the air conditioning system with the new R134A refrigerant, the bearing surfaces of the mating components are not lubricated and correspondingly experience significantly higher incidence of wear.

Therefore, in the absence of an appropriate lubricant, it is necessary to provide a wear resistant material which is essentially self-lubricating. The desired material must be capable of not only providing sufficient lubricity, but must also be sufficiently strong to resist wear and galling during operation of the compressor. In addition, there are certain applications wherein the material must also be sufficiently ductile so as to permit the formation of a component from the material such as by swaging or other forming techniques. Therefore, the requirements of this material are many.

More particularly, in a five cylinder compressor which is in use within several automotive air conditioning systems, known generally as a "Wobble Plate" compressor, there is a "wobble plate" which has five pocketed regions. As shown in FIG. 1, the "wobble plate" has five sockets and is accordingly also referred to as a socket plate. As shown in FIGS. 2 and 3, five high strength steel connecting rods are inserted within each of the five sockets. The socket plate material at each socket is then swaged around the balled end of each connecting rod.

Typically the socket plate has been formed from an aluminum-silicon alloy such as A356 or A357, and has performed quite satisfactorily with the previous refrigerant/lubricant combinations. However, in the absence of a suitable lubricant for use with the new refrigerant, excessive wear and even galling has occurred between the balled ends of the connecting rods and the aluminum-silicon sockets, whereby the softer socket material repeatedly attaches and welds itself to the harder steel connecting rod during use. This is not surprising since the conventional aluminum-silicon alloys are known for their good wear resistance, but only when lubrication is present, since their hard surfaces can be quite damaging when lubrication is not present.

Therefore what is needed is an aluminum alloy for use in this socket plate which is particularly tolerant in the absence of a lubricant, and which resists galling and wear by providing a certain degree of self-lubricity. In addition, the aluminum alloy must be sufficiently ductile to permit swaging of the material, yet sufficiently strong to contain the high pressure refrigerant over the repeated thermal cycling experienced within a typical automotive environment.

SUMMARY OF THE INVENTION

It is therefore an object of this invention to provide a wear-resistant aluminum alloy particularly suitable for use as a wearing component, such as a socket plate, in a compressor unit of an automobile air conditioning system.

It is a further object of this invention that such an aluminum alloy be sufficiently self-lubricating so as to prevent galling of the socket plate during use even in the presence of poor lubrication.

Lastly, it is still a further object of this invention that such an aluminum alloy be characterized by sufficient ductility so as to permit swaging of the socket plate formed from the alloy, yet sufficient strength to contain a pressurized refrigerant.

In accordance with a preferred embodiment of this invention, these and other objects and advantages are accomplished as follows.

According to the present invention, there is provided an improved aluminum-silicon alloy having relatively substantial additions of tin and bismuth, which is particularly wear-resistant and sufficiently self-lubricating so as to be suitable for use as a wearing component, such as a socket plate which receives bearing members within a compressor unit of an automobile air conditioning system. The improved aluminum alloy minimizes wear and alleviates galling of the socket plate during use even in the absence of additional lubricants. In addition, the improved aluminum alloy is also characterized by good strength and sufficient ductility so as to permit swaging of the socket plate formed from the alloy.

The preferred wear resistant aluminum alloy of this invention is characterized by the following elemental composition, wherein the percentages are weight percents: from about seven to eleven percent silicon with about seven to nine percent being most preferred; from about one-half to three percent bismuth with about one to two percent being most preferred; from about one-half to three percent tin with about one to two percent being most preferred; and from about 0.3 to about 0.6 percent magnesium with about 0.45 to about 0.6 percent being most preferred. In addition, the preferred aluminum alloy consists of up to about 0.2 percent copper; up to about 0.2 percent iron; up to about 0.1 percent manganese; up to about 0.1 percent zinc; and optionally between about 0.005 and 0.015 percent phosphorus, with the balance of the alloy being aluminum.

A particularly advantageous feature of the aluminum-silicon alloy of this invention is that the relatively high tin and bismuth additions cooperate with the other elemental additions so as to provide a sufficiently low friction surface (or self-lubricity) which enhances the wear resistant properties of the alloy. Socket plates formed from the preferred alloy exhibit significantly diminished signs of wear during use when connecting rods are engaged within the sockets of the socket plate. In addition, the preferred aluminum alloy of this invention is sufficiently ductile so as to be successfully swaged at room temperature. Further, the strength of this preferred aluminum alloy is also sufficient to contain a high pressure refrigerant even over extended thermal cycling which is characteristic of an automotive environment.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawing wherein.

DETAILED DESCRIPTION OF THE INVENTION

According to the present invention, there is provided an improved aluminum-silicon alloy having relatively substantial additions of tin and bismuth. The improved aluminum-silicon alloy exhibits good wear-resistance by being sufficiently self-lubricating, and therefore is particularly suited for use as a wearing component.

Figure 1:
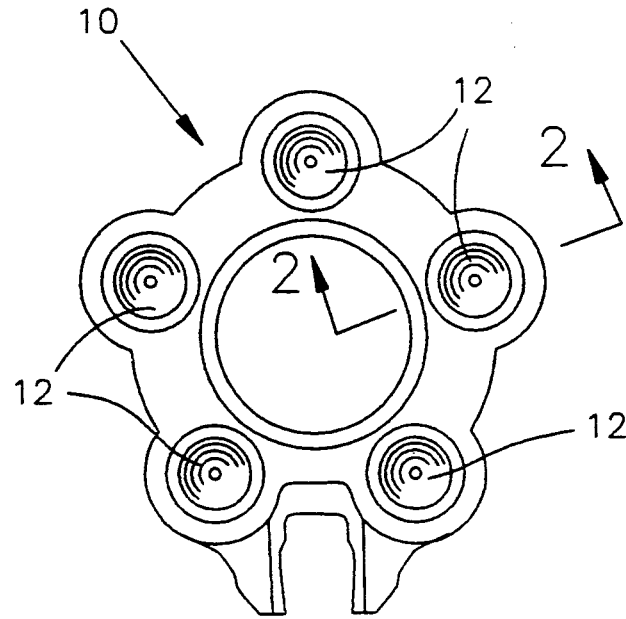
FIG. 1 shows a "wobble plate" or socket plate having five socket regions, formed from the preferred aluminum alloy of this invention, for use in an automotive air conditioning compressor unit.
Figure 2:
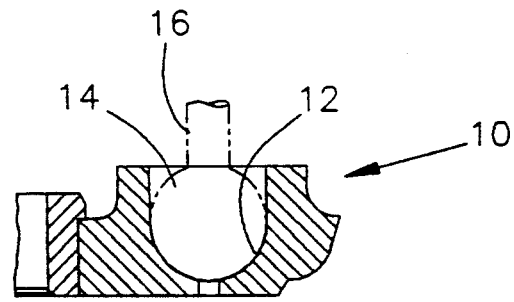
FIG. 2 shows a cross-sectional view of a socket region shown in FIG. 1.
Figure 3:
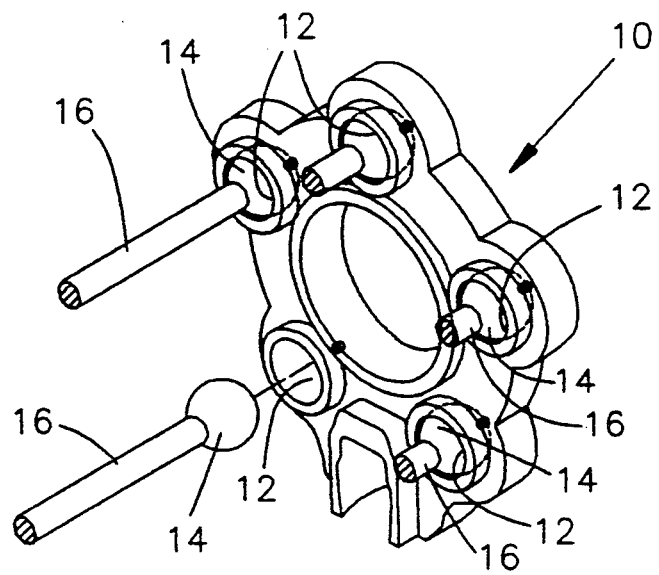
FIG. 3 shows the socket plate of FIG. 1 having five high strength steel connecting rods inserted within each of the five socket regions.

As shown in FIG. 1, the preferred alloy of this invention is used to form a "wobble plate" or socket plate 10 for use in an automotive air conditioning five cylinder compressor unit. The socket plate 10 has five pocketed regions or sockets 12. As shown in FIG. 3, the socket regions 12 of the socket plate 10 receive five high strength steel connecting rods 16. A balled end 14 of each of the five connecting rods 16 engages a corresponding socket 12 on the socket plate 10, as illustrated in FIG. 3 and cross-sectionally in FIG. 2. The dimensional tolerances between the socket 12 and the balled end 14 of the connecting rod 16 are at most only a few thousandths of an inch. The connecting rods 16 reciprocate within the socket regions 12 of the socket plate 10 and are continuously subjected to high pressures from the refrigerant during operation of the automotive air conditioning compressor unit. Therefore the balled end 14 is essentially a bearing member which bears against the socket 12. (It is to be noted that although the socket plate 10 is the intended application for the alloy of this invention, it is foreseeable that this alloy could be used in a multitude of various applications, such as those which require wear resistance.)

The improved aluminum-silicon alloy of this invention minimizes wear and alleviates galling of the socket plate 10 during use even when poorly lubricated. In addition, the improved aluminum alloy is sufficiently ductile so as to permit swaging of each of the socketed regions 12 around the balled end 14 of the corresponding connecting rod 16.

In particular, the self-lubricating, wear resistant aluminum-silicon alloy of this invention is characterized by the preferred elemental composition shown in Table I., wherein the percentages refer to weight percents.

TABLE I

| Si | 7.0%–11.0% |
| --- | --- |
| Bi | 0.5%–3.0% |
| Sn | 0.5%–3.0% |
| Mg | 0.3%–0.6% |
| Cu | 0.25% (max.) |
| Fe | 0.2% (max.) |
| Mn | 0.15% (max.) |
| Zn | 0.15% (max.) |
| Al | Balance |

More particularly, the silicon (Si) content of this aluminum-silicon alloy may vary from about seven to about eleven percent to ensure good wear resistance of the material, with the range of about seven to nine percent being most preferred. The silicon within the alloy reacts with the aluminum to form hard aluminum-silicon particles which increase the wear resistance of the material, as discussed more fully later.

The silicon content of the preferred aluminum-silicon alloy should remain below about 12.3 percent, which is the eutectic point in the aluminum-silicon phase diagram, making the preferred alloy a hypo-eutectic aluminum-silicon alloy. Maintaining the silicon level below the eutectic point ensures that hard primary silicon particles will not form within the preferred alloy. In addition, the ductility of the alloy is reduced as the silicon content is increased, accordingly it is desirable to maintain this hypo-eutectic level of silicon. Sufficient ductility is required so as to be capable of swaging the socket plate 10 for use in the compressor unit of the air conditioning system. Therefore, in the preferred alloy, the presence of the primary silicon particles is not desired and so to ensure that their formation does not occur, as well as to ensure a sufficient level of ductility, the silicon content is kept well below the eutectic point.

The bismuth (Bi) content of the preferred aluminum-silicon alloy may vary from about one-half percent to three percent, with a range of about one to two percent being most preferred. It has been determined that the presence of bismuth within the alloy enhances the lubricity of the alloy by essentially remaining as elemental bismuth within the alloy. The elemental bismuth reduces the coefficient of friction on the bearing surfaces. However, although the lubricity of the alloy is enhanced by the bismuth and it would seem therefore that a greater amount is desired, the bismuth must also be limited since it tends to react with the magnesium to form $Mg_3Bi_2$ which reduces the strengthening potential of the alloy, since the magnesium generally provides the strengthening phase within the alloy. Therefore, it is desirable to limit the bismuth content to about one to two weight percent within the preferred alloy. This range of bismuth provides the enhanced lubricity while minimizing the loss of strength of the alloy.

The tin (Sn) content of the preferred aluminum-silicon alloy may also vary from about one-half to about three weight percent, with about one to two percent being most preferred. The effects of tin within the alloy are very similar to the self-lubricating effects associated with the presence of bismuth, as discussed above. The tin remains primarily as elemental tin within the alloy and tends to enhance the lubricity of the alloy by reducing the coefficient of friction of the bearing (or rubbing) surfaces. However, some tin also tends to react with the magnesium thereby reducing the strengthening potential for the alloy. The range of about one to two weight percent tin appears to optimize these competing concerns and therefore is again most preferred.

The magnesium (Mg) content preferably ranges from about 0.3 to about 0.6 weight percent, with a range of about 0.45 to about 0.6 percent being most preferred. The magnesium reacts with the aluminum during heat treatment to form a strengthening compound, magnesium-silicide ($Mg_2Si$), which precipitates out and resides in the grain boundaries of the alloy. The preferred concentration of magnesium within the alloy appears to result in an adequate level of strength for use in the socket plate 10 environment. However, depending on the intended application for the alloy, the strength requirements may vary which may accordingly necessitate a change in the magnesium content.

The preferred copper (Cu) content within the aluminum alloy of this invention may vary up to about 0.25 percent with about 0.2 percent being most preferred. It is believed that the copper enhances the age hardening effects of the alloy by precipitating fine particles of copper-aluminide ($CuAl_2$) homogeneously throughout the alloy, which is an additional strengthening phase for the alloy. Yet, an excess of copper may tend to degrade the overall characteristics of the alloy. Therefore optimal results appear to be achieved with a maximum copper concentration of about 0.2 weight percent.

The preferred iron (Fe) content within the aluminum alloy of this invention may vary up to about 0.2 percent iron. The ductility of the alloy is typically impaired by the presence of iron within the alloy due to the formation of the aluminum-iron-silicon (Al—Fe—Si) compound. Therefore, it is desirable to minimize the iron content within the alloy, yet it is difficult to entirely eliminate the iron within the alloy since this level of iron is typically always present within the primary aluminum used to form the alloy.

In addition, the manganese (Mn) and zinc (Zn) contents within the preferred alloy may each vary up to about 0.15 weight percent, with a maximum of about 0.1 percent being most preferred for each element. These ranges for both the manganese and zinc again are normal levels found within the primary aluminum after smelting from bauxite prior to casting of the alloy, and are therefore going to be normally present within the final alloy.

Optionally, the alloy of this invention may include between about 0.005 and 0.015 weight percent phosphorus (P), with a concentration of about 0.010 percent being most preferred. This trace amount of phosphorus will tend to increase or induce the formation of some primary silicon so as to enhance the wear resistance of the alloy without significantly reducing the ductility or coefficient of friction of the alloy. The phosphorus would be added to the alloy by conventional phosphorus treatment methods, which include adding a phosphorus containing compound, such as a phosphorus-copper compound, to the melt during casting, since it is difficult to add phosphorus directly to the melt because of its fine powdery form. The addition of phosphorus is optional depending on the desired application for the material and the competing concerns of ductility versus wear resistance.

It is also to be noted that trace levels of strontium could be substituted for the phosphorus within the alloy with essentially the same results obtained. The strontium would provide a structure which is slightly higher in ductility, but a slight loss in the galling or wear resistance of the alloy would also be observed. Depending on the application, this may be desirable.

The balance of the preferred alloy is aluminum.

Several samples of the self-lubricating, wear resistant aluminum-silicon alloy of this invention were prepared using conventional casting techniques. The most preferred composition for the alloys, as discussed above, is summarized in Table II. Again, the percentages refer to weight percents.

TABLE II

| | |
|---|---|
| Si | 7.0%–9.0% |
| Bi | 1.0%–2.0% |
| Sn | 1.0%–2.0% |
| Mg | 0.45%–0.6% |
| Cu | 0.2% (max.) |
| Fe | 0.2% (max.) |

TABLE II-continued

| | |
|---|---|
| Mn | 0.1% (max.) |
| Zn | 0.1% (max.) |
| P | 0.005%–0.015% |
| Al | Balance |

Test bar samples of the preferred alloy of Table II. were heat treated using a conventional T61 aluminum alloy heat treating schedule as described by the following steps, so as to maximize the tensile and yield strengths of the alloy while maintaining adequate elongation. It should be noted that the particular heat treatment schedule employed on the alloy will vary depending on the intended application for the alloy. In particular, any of the T6 aluminum heat treating schedules which basically solution heat treat, quench and then artificially age the alloy would probably be suitable for these wear resistant applications. Several different heat treatment schedules were tested for the preferred alloy in order to determine the optimum treatment. The following two T61 heat treatment schedules having different solution treatment temperatures and durations, were employed on two sets of the preferred alloy and resulted in the optimal properties for the alloy in the socket plate 10 environment.

Schedule A consisted of first solution treating the alloy to about 980° F. ±5° F. for about 12 hours to form a solid solution of magnesium-silicide ($Mg_2Si$), quenching in water, then naturally aging the alloy at room temperature for less than about 15 minutes, and finally artificially aging the alloy at about 310° F. ±5° F. for about eight hours to precipitate the magnesium-silicide throughout the alloy.

Schedule B consisted of again first solution treating the alloy to about 960° F. ±10° F. for about 8 hours so as to form the magnesium-silicide compound, quenching in water, then naturally aging the alloy at room temperature for less than about 15 minutes, and finally artificially aging the alloy at about 310° F. ±5° F. for about eight hours to precipitate the magnesium-silicide throughout the alloy.

The natural aging step is not necessary, however it may occur due to the practicalities of moving these alloys from one processing station to another during the heat treatment process.

Both heat treatment schedules resulted in the preferred alloy having the desired properties for the socket plate application. Therefore either heat treatment schedule could be employed, as well as reasonable variations such as in the temperatures, durations, or quenching medium, with satisfactory results expected.

After heat treatment, the preferred aluminum-silicon alloys of this invention were examined using conventional metallographic techniques. The aluminum-silicon particles within the alloys of this invention are characterized by an acicular or needle-like shape. These acicular particles are characterized by a high surface area, or high aspect-ratio, which improves the wear resistance of the alloy. The preferred alloys of this invention contain these acicular-shaped particles throughout the entire alloy. The presence of these hard acicular silicon particles throughout these alloys has been found to significantly improve their wear and galling resistant properties, particularly as compared to conventional alloys.

The mechanical properties for the preferred aluminum-silicon alloys heated treated in accordance with Schedule B were determined and are as follows; an average yield strength of about 27,000 pounds per square inch (psi), and an average tensile strength of about 33,000 psi, with an average elongation value of about six percent. The strength of the alloy is sufficient to contain the high pressure refrigerant during operation of the compressor even over repeated thermal cycling, as compared to previous conventional materials which have been employed for the socket plate 10.

The average hardness, as determined by standard Brinell measurements (using a 500 kilogram load and 10 millimeter indentor for 30 seconds) was about 69.

The preferred alloy of this invention having the tin and bismuth additions, was tested against several other conventional aluminum alloys which would be considered for use in a bearing environment which requires good wear resistance. The preferred alloy of this invention exhibited significantly better wear and galling resistance.

Lastly, it should be noted that the socket regions 12 of the socket plate 10 formed from the alloy of this invention were successfully swaged at room temperature around the balled ends 14 of their corresponding connecting rods 16, with the results of this forming operation being comparable to previous conventional materials which have been employed for this purpose. Therefore the alloy of this invention is sufficiently ductile as compared to the conventional materials.

In summary, there are many advantageous features associated with the aluminum-silicon alloy of this invention. The relatively high tin and bismuth additions essentially remain in their elemental form within the alloy and cooperate with the other constituents to provide a sufficiently self-lubricating, low friction surface which, in turn, enhances the wear resistant properties of the alloy as well as its machinability. Socket plates 10 formed from the preferred alloy exhibit significantly enhanced wear and galling resistance during use when connecting rods 16 are engaged within the sockets 12 of the socket plate 10. In addition, the preferred aluminum alloy of this invention is sufficiently ductile so as to be successfully swaged at room temperature. Further, the strength of this preferred aluminum alloy is also sufficient to contain a high pressure refrigerant.

Therefore, while our invention has been described in terms of a preferred embodiment, it is apparent that other forms could be adopted by one skilled in the art, such as by modifying the aluminum alloy within the preferred ranges of element concentrations, or by modifying the processing steps, or by employing the alloy in a different environment. Accordingly, the scope of our invention is to be limited only by the following claims.

The embodiments of the invention in which an exclusive property or privilege is claimed are defined as follows:

1. A room temperature formable, wear resistant aluminum alloy particularly suitable for use as a wear surface component in an automotive air conditioning compressor unit, said wear resistant aluminum alloy having sufficient self lubricity so as to prevent wear and galling even when poorly lubricated, said wear resistant aluminum alloy consisting essentially of the following by weight:

from about seven to eleven percent silicon;
from about one-half to three percent bismuth;
from about one-half to three percent tin;
from about 0.3 percent to about 0.6 percent magnesium;

at most about 0.25 percent copper;
at most about 0.2 percent iron;
at most about 0.15 percent manganese;
at most about 0.15 percent zinc; and
the balance being substantially all aluminum with incidental impurities;
such that said tin and bismuth additions essentially remain in their elemental form within said wear resistant aluminum alloy so as to provide lubricity to said wear resistant alloy, while said magnesium and silicon sufficiently cooperate to form the strengthening component of said wear resistant alloy, said wear resistant alloy being further characterized by adequate ductility so as to permit the room temperature forming operations of said alloy.

2. A wear resistant aluminum alloy as recited in claim 1 wherein said silicon ranges from about seven to nine percent.

3. A wear resistant aluminum alloy as recited in claim 1 wherein said bismuth and tin both range from about one to two percent.

4. A wear resistant aluminum alloy as recited in claim 1 wherein said magnesium ranges from about 0.45 percent to about 0.6 percent.

5. A wear resistant aluminum alloy as recited in claim 1 wherein said alloy further contains from about 0.005 to about 0.015 percent phosphorus.

6. A wear resistant aluminum alloy as recited in claim 1 wherein said silicon sufficiently cooperates with said aluminum so as to form an aluminum-silicon phase which is primarily acicular in shape.

7. A wear resistant aluminum-silicon alloy particularly suitable for use in an automotive air conditioning unit having a socket plate formed from the wear resistant alloy, wherein the socket plate has a plurality of sockets which receive a corresponding plurality of bearing members, said wear resistant aluminum alloy having sufficient lubricity so as to prevent wear and galling between the sockets and bearing members even when poorly lubricated, while also having sufficient ductility so as to permit swaging of the socket around each bearing member, said wear resistant aluminum-silicon alloy consisting essentially of the following by weight:
from about seven to nine percent silicon;
from about one to two percent bismuth;
from about one to two percent tin;
from about 0.45 percent to about 0.6 percent magnesium;
at most about 0.2 percent copper;
at most about 0.2 percent iron;
at most about 0.1 percent manganese;
at most about 0.1 percent zinc; and
the balance being substantially all aluminum with incidental impurities;
such that said silicon and aluminum cooperate to form a primarily acicular shaped aluminum-silicon phase, and said tin and bismuth additions essentially remain in their elemental form so as to provide lubricity to said wear resistant alloy, while said magnesium and silicon sufficiently cooperate to form the strengthening component of said wear resistant alloy, said wear resistant alloy being further characterized by adequate ductility so as to permit the room temperature swaging and/or other forming operations of said alloy.

8. A wear resistant aluminum alloy as recited in claim 7 wherein said alloy further contains from about 0.005 to about 0.015 percent phosphorus.

* * * * *